United States Patent [19]

Claar et al.

[11] Patent Number: 5,031,957
[45] Date of Patent: Jul. 16, 1991

[54] FOLDING TOP INTERMEDIATE BOW

[75] Inventors: Klaus Claar, Gechingen Fasanenweg; Jürgen Schrader, Stuttgart; Harald Koppenstein, Filderstadt; Martin Guckel, Wiernsheim, all of Fed. Rep. of Germany

[73] Assignee: Daimler-Benz Aktiengesellschaft, Fed. Rep. of Germany

[21] Appl. No.: 542,029

[22] Filed: Jun. 22, 1990

[30] Foreign Application Priority Data

Jun. 22, 1989 [DE] Fed. Rep. of Germany ....... 3920444

[51] Int. Cl.$^5$ .............................................. B60J 7/12
[52] U.S. Cl. .................................. 296/108; 296/117; 296/122
[58] Field of Search ............... 296/107, 108, 116, 117, 296/122

[56] References Cited

U.S. PATENT DOCUMENTS

| 3,442,551 | 5/1969 | Hussey | 296/117 |
| 4,712,828 | 12/1987 | Albrecht | 296/107 |
| 4,746,163 | 5/1988 | Muscat | 296/107 |
| 4,747,635 | 5/1988 | Wagner | 296/107 |
| 4,828,317 | 5/1989 | Muscat | 296/116 |

FOREIGN PATENT DOCUMENTS 3724532 11/1988 Fed. Rep. of Germany ...... 296/107

Primary Examiner—Robert R. Song
Attorney, Agent, or Firm—Evenson, Wands, Edwards, Lenahan & McKeown

[57] ABSTRACT

An intermediate folding top bow is fastened, via cantilevers arranged at its ends, to lateral roof-frame parts of a vehicle folding-top structure. During the opening operation of the folding-top structure, the intermediate bow is pivotable out of a tensioning position directed forwardly into a stowage position directed rearwardly. To make it possible to ensure that the intermediate bow will be stowed automatically and without being damaged, the intermediate bow is loaded during the opening of the folding top with a pivoting effect by a separate working element so that starting from its tensioning position, the intermediate bow is driven beyond a dead center between its tensioning position and its stowage position.

15 Claims, 2 Drawing Sheets

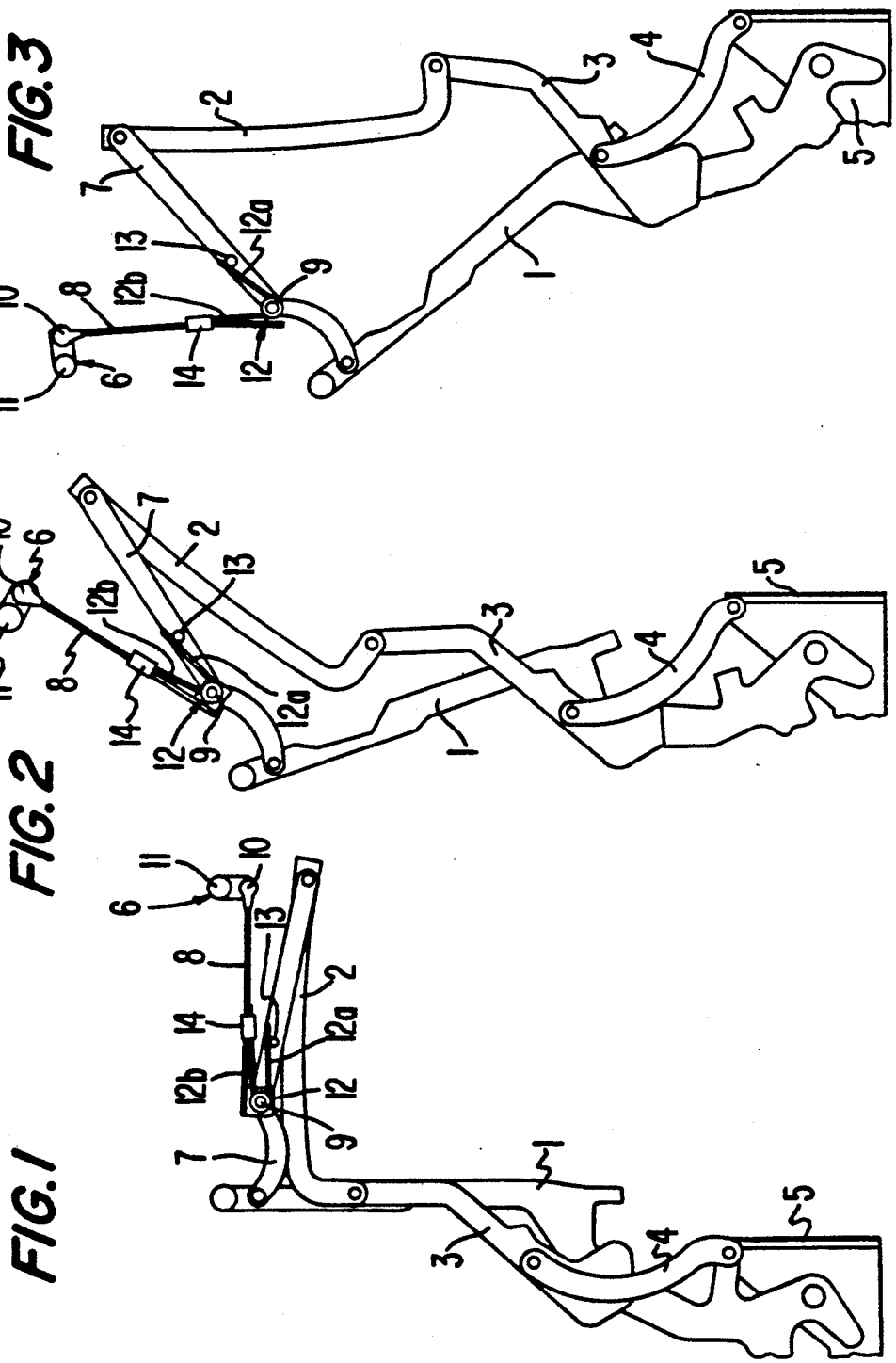

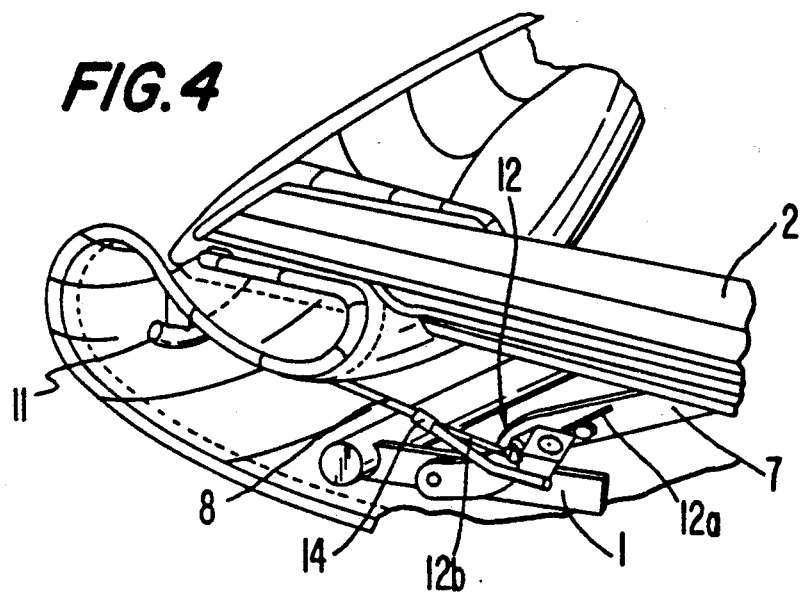
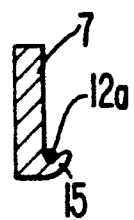
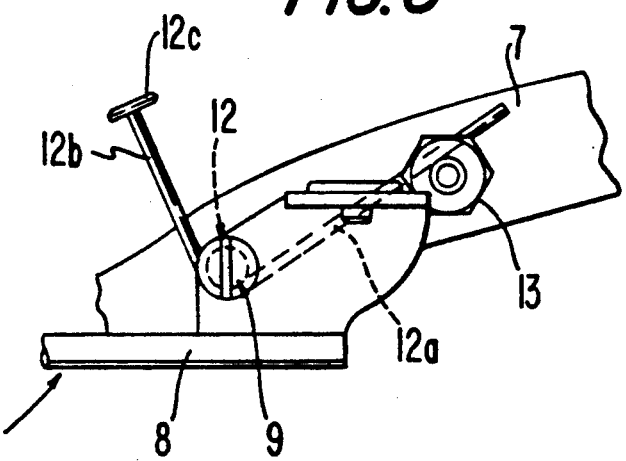
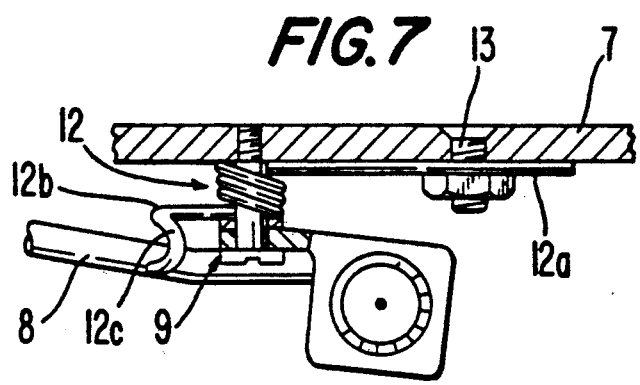

FOLDING TOP INTERMEDIATE BOW

BACKGROUND AND SUMMARY OF THE INVENTION

The present invention relates to an intermediate bow of a folding top, and, more particularly, to an intermediate bow which is fastened, via cantilevers arranged at its ends, to lateral roof-frame parts of the folding-top structure such that, during the opening of the folding top, the intermediate bow is loaded with a pivoting effect to assure automatic storage of the folding top without damage.

An intermediate bow is already know, for example, from German Patent Specification 3,724,532. This intermediate bow is connected to the folding top covering which spans the bow. During the closing of the folding top, the bow is taken up by the increasingly taut folding-top covering and is thereby positively pivoted out of its stowage position directed rearwards into its tensioning position directed forwards. It is, therefore, also referred to as a drag bow.

When the folding top is being opened, and the folding-top covering relaxes and arranges itself in folds, the drag principle can be adopted to only a limited extent for the necessary backward pivoting movement of the intermediate bow. In a first phase of the opening operation, the folding-top covering lifts off from the lateral roof frames of the folding-top structure in the region of the connection with the intermediate bow and thereby initiates a partial backward pivoting movement of the intermediate bow. It is nevertheless impossible to ensure that the intermediate bow goes beyond its turn dead center towards the stowage position, after which is could be pivoted further right into its stowage position by the folding pressure of the structure parts swinging onto one another.

Where the folding top is actuated manually, this situation results in unsatisfactory handling, because the intermediate bow may need to be pushed rearwards beyond its turn dead center by manual action.

If, in contrast, automatic folding-top actuation, such as a hydraulic drive an insufficient pivoting advance of the intermediate bow when the folding top is being opened can lead to serious damage to the intermediate bow itself and/or to adjacent structure parts.

An object of the present invention is, therefore, to provide a folding top intermediate bow which ensures that, during the opening operation of the folding top, the intermediate bow will be stowed automatically and without any damage, irrespective of the method of actuating the folding top.

The foregoing object has been achieved in accordance with the present invention by providing that during the opening operation of the folding top, the intermediate bow is loaded with a pivoting effect beyond its critical turn dead center.

In a presently preferred embodiment of the present invention, a pivoting drive consists of a spring accumulator drive which, when the folding top is being closed, can be tensioned by the advance of the folding-top covering. The spring-accumulator drive can consist, for example, of a tension-spring arrangement between a bow tube of the main bow and the intermediate bow. With the folding top closed, the tension springs are stretched longitudinally by an amount matched to the pivoting advance of the intermediate bow. The freedom of constructive design would be restricted considerably by this, however, since, with the folding top closed, the tension springs preferably consisting of flat rubber bands have to extend at a sufficient moment distance from the pivot axis of the intermediate bow.

Moreover, for stability reasons, it has been found desirable to provide a pair of leg springs for the pivoting drive of the intermediate bow. In each case, the spring winding of the leg spring can take a course concentric relative to the circular path of the intermediate bow as the intermediate bow pivots about a hinge bearing on a roof-frame link, the intermediate bow being coupled to the hinge bearing by a cantilever, an axis from the hinge bearing to the intermediate bow being a pivot axis of the intermediate bow. A protective arrangement of the respective spring windings between the cantilever and the associated roof-frame link is also possible.

A favorable dimensioning of the leg springs can be obtained if, in the expanded state, their spring legs form an angle markedly smaller than the pivot angle of the cantilevers between the tensioning position and the stowage position.

If the roof-frame links of the folding top are pivoted in the width direction of the folding top during the operation of swinging the links in and out, that spring leg of the leg spring supported on the cantilever should be slide-guided on the cantilever.

A particularly simple and good sliding guide comprises a hook-shaped bend of the spring leg which, partially surrounding the circumference of the cantilever, is mounted slidably on this. The cantilevers are especially suitable as sliding counterparts for the associated spring leg if they consist of links of round cross-section.

BRIEF DESCRIPTION OF THE DRAWINGS

These and other objects, features and advantages of the present invention will become apparent from the following detailed description when taken in conjunction with the accompanying drawings wherein:

FIG. 1 is a schematic view of the front side-wall structure parts of a folding top with an intermediate bow located in a tensioning position in accordance with the present invention;

FIG. 2 is a view similar to FIG. 1 but after a first opening phase of the folding top;

FIG. 3 is the view similar to FIG. 1 but in an opening phase with the intermediate bow erected into its turn dead center position;

FIG. 4 is a perspective side view of the intermediate bow of the present invention in its stowage position;

FIG. 5 is a cross-sectioned view of a catch stop for a leg of a spring;

FIG. 6 is an elevational view of an arrangement of another embodiment of a leg spring; and FIG. 7 is a top view of the region of the arrangement of the leg spring embodiment of FIG. 6.

DETAILED DESCRIPTION OF THE DRAWINGS

A folding-top structure, not shown completely, of a known folding top with symmetrical side-wall structure parts generally comprises, in each front side-wall region, a main bow folding-top column 1, a one piece lateral roof frame 2, and a main link 3, a reversing link 4, a bearing bracket 5, an intermediate bow 6 and a roof frame link 7.

The folding top can be retracted into an associated folding-top box of a convertible body by tilting the folding-top column 1 rearwards for approximately 90° from its erected position according to FIG. 1 about its main bearing on the bearing bracket 5. With the exception of the intermediate bow 6, all the structure members mentioned are connected to one another to form a positive articulated linkage and are thereby motionally controlled as a function of the pivot angle of the folding-top column 1. With the folding top closed, the intermediate bow 6, by virtue of its function, bears under an upwardly directed prestress against the folding-top covering approximately centrally between a header and the main bow, and, with the folding top retracted, it is stowed underneath the roof top. To make this possible, it is fastened at both ends to the associated roof-frame link 7 via a cantilever 8. A hinge bearing 9 provided for this purpose is located in the rear end region of the associated roof-frame link 7, with the result that, with the folding top closed in FIG. 1, the cantilever 8 projects forwards virtually parallel with the longitudinal extension of the roof frame 2. The front end of the cantilever 8 is connected by means of a ball joint 10 to a downwardly bent end of a bow tube 11 of the intermediate bow 6. The bow tube 11 is held rotatably between its bent ends in a loop guide (not shown) extending in the width direction of the folding-top covering, thereby making a loop connection of the folding top covering to the intermediate bow 6.

Notwithstanding this loop connection, it cannot be ensured when the folding top is being opened that the intermediate bow 6 will participate in the folding advance of the folding top covering and thus assume its stowage position, as seen in FIG. 4, in which its cantilevers 8 are pivoted rearwards for approximately 170° about its hinge bearing 9 in relation to the roof-frame link 7. A pivoting drive is therefore provided for the intermediate bow 6.

The pivoting drive includes two spring-wire leg springs 12, which are bent symmetrically and supported respectively between the lateral roof-frame links 7 and the cantilever 8 fastened to these links. The winding of these leg springs 12 surrounds an axle of the associated hinge bearing 9 with circumferential play. Two spring legs 12a, 12b of the leg springs 12, forming a U-shape, extend respectively, along the roof-frame link 7 and the cantilever 8 away from the hinge bearing 9, where they are connected respectively to the roof-frame link 7 and the cantilever 8 at a longitudinal distance from the hinge bearing 9. A screw fastening 13 is provided on the wide side of the roof-frame link 7 to connect the spring leg 12a to the link 7.

The fastening of the spring leg 12b to the cantilever 8 presents a more difficult problem, since the distance between the the lateral hinge bearings 9 varies during the in and out swinging operation of the folding top. These distance changes are absorbed by the cantilevers 8 which experience flexurally elastic deformation over their length in the width direction of the folding top. For this purpose, the cantilevers 8 are constructed as resilient tubular links.

In order that the contraction and expansion movements of the cantilevers 8 do not lead to an unnecessary additional load on the leg springs 12, the spring leg 12b is longitudinally displaceably mounted on the cantilever 8 by pushing onto the cantilever 8 an exactly fitting tubular sleeve 14 which is secured against sliding axially on the cantilever 8 by a clamping screw (not shown).

The tubular sleeve 14 has a coaxial guide bore, through which the end region of the spring leg 12b passes. The circumferential play between the wire of the spring leg 12b and the guide bore is selected so that, under bending deformations of the cantilever 8, the spring leg 12b slides along in the guide bore and prevents a buckling load from being imposed on the spring leg 12b.

To ensure that the intermediate bow 6 is driven through the entire pivot angle between its tensioning position and its stowage position, the leg spring 12 must have an expansion angle of approximately 180°.

Because of the loop connection between the intermediate bow 6 and the folding-top covering, the intermediate bow 6 does not snap rearwards abruptly when the folding top is opening. Its backward pivoting movement is controlled as a function of the backward pivoting movement of the roof frame 2 because the folding-top covering is secured to the roof top at the front. This ensures a harmonious backward pivoting movement, as can be seen from the phase representation according to FIGS. 1 to 4.

When the folding top is being closed, the folding-top covering pulls the intermediate bow 6 out of its stowage position into its tensioning position.

Since the bow tube 11 is connected to the roof top via the folding-top covering, and since the roof top moves forward and upward on its circular path according to the rotational movement of the roof frames 2, the intermediate bow 6 is taken up and at the same time pivoted forward in relation to the roof-frame links 7. Shortly before it reaches its tensioning position, the cantilevers 8 are blocked against further pivoting relative to the roof-frame links 7 by a known blocking stop, so that, with the folding top completely closed, the intermediate bow 6 bears under an upwardly directed prestress against the folding-top covering and makes the covering taut. The prestress occurs as a result of a slight bending of the cantilevers 8. By virtue of the above-explained drag principle of the intermediate bow 6, the leg springs 12 are automatically transferred from their substantially expanded stowage position into their contracted accumulator position, so that they are regenerated for the pivoting drive of the intermediate bow 6.

The spring actuated pivoting drive of the intermediate bow 6 through the complete pivot angle of the cantilevers 8 requires oversized leg springs 12 to ensure durability. Moreover, in order to ensure the backward pivoting function of the intermediate bow 6 during the opening of the folding top, it is sufficient if, starting from the tensioning position, the intermediate bow 6 is loaded with a pivoting effect over an angle of approximately 90°. The turn dead center of the intermediate bow 6 is then already exceeded to such an extent that the bow 6 can subsequently be pivoted further right into its stowage position by the folding pressure of the roof frames 2 being retracted rearwards.

To achieve the foregoing, a leg spring corresponding to the shape of the leg spring 12 can be designed so that, in the expanded state, the leg springs 12a and 12b form an angle of approximately 90° as shown in the embodiment of FIG. 6. Furthermore, the screw fastening 13 on the roof-frame link 7 is replaced by a catch stop 15 shown in FIG. 5 which supports the spring leg 12a only counter to its expansion direction. The catch stop 15 is an angled portion which is formed on and projects laterally from the roof-frame link 7. The free edge zone of the catch stop 15 is itself angled upwards, thereby providing an approximately U-shaped catch seat for the spring leg 12a. As a result of this configuration of the catch stop 15, the spring leg 12a lifts off from the catch stop 15 as soon as the expanded position of the leg spring is assumed. In the expanded state, the leg spring 12 participates in the further backward pivoting movement of the intermediate bow 6 because its spring leg 12b is coupled to the cantilever 8 and thereby increasingly moves with its spring leg 12a further away from the catch stop 15. When the intermediate bow 6 is finally in its stowage position, the spring leg 12a is directed steeply upwards. This embodiment of the leg spring can be used only when, in the stowage position, sufficient free space is available for the spring leg 12a between the associated roof frame 2 and the corresponding cantilever 8.

During the closing of the folding top, the spring leg 12a again comes up against the catch stop 15 after a corresponding angular movement of the cantilever 8 and supports it on the roof-frame link 7 over the contraction and expansion travel of the leg spring 12. This catching principle can also be reversed, with the leg 12a being connected permanently to the roof-frame link 7, and the spring leg 12b interacting with the cantilever 8 only over the contraction and expansion travel of the leg spring 12.

FIG. 6 illustrates this alternative embodiment in which the intermediate bow 6 is in its stowage position. The spring leg 12a is connected to the roof-frame link 7 by the screw fastening 13 or in any similarly acceptable manner. In contrast, the spring leg 12b is in an erected catch position uncoupled from the cantilever 8. A catch device is provided on the spring leg 12a itself and is a combination of a catch fork 12c and a sliding guide.

A particularly simple and effective design of this catch device has an extension of the spring leg 12b bent laterally to form the catch fork 12c. The clear fork aperture of the catch fork 12c is arranged to face the cantilever 8 in its pivoting plane. The catch fork 12c surrounds the cantilever 8 automatically during the erection of the cantilever 8 and ensures the transmission of the supporting force over the contraction and expansion angle of the leg spring 12. Because of the round cross-section of the cantilever 8, it nevertheless remains possible for the catch fork 12c to slide along easily, without tilting, under bending deformations of the cantilever 8. There is therefore no need for additional measures for guiding the spring leg 12b.

Irrespective of which embodiment of the leg springs 12 is selected, the leg springs can be advantageously arranged in a protected manner between the roof-frame link 7 and the cantilever 8. As can be seen in FIG. 7, the cantilever 8 is, at the hinge bearing 9, at a lateral distance from the roof-frame link 7 which is bridged by a spacer axle of the hinge bearing 9. The winding of the leg spring 12 surrounding the axle of the hinge bearing 9 is thus covered on both sides due to its location between the wide side of the roof-frame link 7 and a wide side of an end bearing flange of the cantilever 8. This ensures that the spring winding of the leg spring 12 does not bear against the folding-top covering in any tilting position of the folding top with a resultant pressure damage to the folding-top covering which is susceptible to damage.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A folding top intermediate bow comprising:
   an intermediate bow member having ends;
   cantilevers coupled to the ends of the intermediate bow member and to lateral roof-frame parts of a vehicle folding-top structure at joints;
   wherein the intermediate bow member is pivotal on the cantilevers about the joints between
   (a) a tensioning position directed toward a forward portion of the vehicle,
   (b) a stowage position directed toward a rearward portion of the vehicle, and
   (c) a turn dead center position between the tensioning position and the stowage position; and
   means for loading the intermediate bow member with a pivoting effect such that, during an opening operation of the vehicle folding-top structure, the pivoting effect drives the intermediate bow member from the tensioning position beyond the turn dead center position.

2. The folding top intermediate bow according to claim 1, wherein:
   the intermediate bow member is coupled to a covering of the folding-top structure by a pull connection;
   the means for loading includes a spring-accumulator drive having a regenerated accumulator position; and
   during a closing operation of the folding top, the pull connection positively transfers the spring-accumulator drive into the regenerated accumulator position.

3. The folding top intermediate bow according to claim 2, wherein the spring-accumulator drive comprises two leg springs supported at both sides of the folding-top structure between the cantilevers and an associated roof-frame member.

4. The folding top intermediate bow according to claim 3, wherein the leg springs have two spring legs operatively arranged to be contracted and expanded about associated articulation points of the cantilevers on the roof-frame member.

5. The folding top intermediate bow according to claim 4, wherein the cantilevers are fastened at a distance relative to the associated roof-frame member, and the leg spring is provided with a spring winding between the respective cantilevers and the associated roof-frame member.

6. The folding top intermediate bow according to claim 3, wherein in an expanded state, two spring legs of the leg spring form an angle larger than the pivot angle of the respective cantilevers relative to the roof-frame member between the tensioning position and the turn dead-center position of the intermediate bow member, and one of the two spring legs of the leg spring is motionally coupled permanently to a supporting component comprising one of the cantilevers and the roof-frame member, and the other spring leg cooperates with a catch stop on the supporting component.

7. The folding top intermediate bow according to claim 3, wherein the intermediate bow is operatively connected to lateral roof-frame members via the cantilevers, so as to be spreadable in the width direction of the folding-top structure, and a spring leg of the leg springs is supported on the cantilever and is longitudinally displaceably guided on the cantilever.

8. The folding top intermediate bow according to claim 1, wherein the cantilevers comprise round cross-section links.

9. The folding top intermediate bow according to claim 8, wherein the cantilevers are resilient tubular links.

10. The folding top intermediate bow according to claim 9, wherein:
   the intermediate bow member is coupled to a covering of the folding-top structure by a pull connection;
   the means for loading includes a spring-accumulator drive having a regenerated accumulator position; and
   during a closing operation of the folding top, the pull connection positively transfers the spring-accumulator drive into the regenerated accumulator position.

11. The folding top intermediate bow according to claim 10, wherein the spring-accumulator drive comprises two leg springs supported at both sides of the folding-top structure between the cantilevers and an associated roof-frame member.

12. The folding top intermediate bow according to claim 11, wherein the leg springs have two spring legs operatively arranged to be contracted and expanded about associated articulation points of the cantilevers on the roof-frame member.

13. The folding top intermediate bow according to claim 12, wherein the cantilevers are fastened at a distance relative to the associated roof frame member, and the leg spring is provided with a spring winding between the respective cantilevers and the associated roof-frame member.

14. The folding top intermediate bow according to claim 13, wherein the intermediate bow member is operatively connected to lateral roof-frame members via the cantilevers, so as to be spreadable in the width direction of the folding-top structure, and a spring leg of the leg springs is supported on the cantilever and is longitudinally displaceably guided on the cantilever.

15. The folding top intermediate bow according to claim 11, wherein in an expanded state, two spring legs of the leg spring form an angle larger than the pivot angle of the respective cantilevers relative to the roof-frame member between the tensioning position and the turn dead center position of the intermediate bow member, and one of the two spring legs of the leg spring is motionally coupled permanently to a supporting component comprising one of the cantilevers and the roof-frame member, and the other spring leg cooperates with a catch stop on the supporting component.

* * * * *